(12) United States Patent
Kuelbs

(10) Patent No.: US 7,830,110 B1
(45) Date of Patent: Nov. 9, 2010

(54) SOLAR-POWERED THERMOMETER

(75) Inventor: Gustav P. Kuelbs, Grapevine, TX (US)

(73) Assignee: World Factory, Inc., Westlake, TX (US)

( * ) Notice: Subject to any disclaimer, the term of this patent is extended or adjusted under 35 U.S.C. 154(b) by 0 days.

(21) Appl. No.: 12/570,903

(22) Filed: Sep. 30, 2009

Related U.S. Application Data

(62) Division of application No. 11/368,193, filed on Mar. 3, 2006, now Pat. No. 7,615,962.

(51) Int. Cl.
*H01M 10/44* (2006.01)
*G01K 1/14* (2006.01)

(52) U.S. Cl. ........................................ 320/101; 374/141

(58) Field of Classification Search ................ 374/100, 374/194, 121, 141; 320/101
See application file for complete search history.

(56) References Cited

U.S. PATENT DOCUMENTS

| | | | |
|---|---|---|---|
| 1,851,083 A * | 3/1932 | Brainard ..................... 374/194 |
| 4,451,157 A | 5/1984 | Reap |
| 4,601,589 A * | 7/1986 | Meisner ...................... 374/208 |
| 4,763,310 A | 8/1988 | Goetzberger |
| 4,891,252 A * | 1/1990 | Kaiser, Jr. ..................... 428/31 |
| 5,152,610 A * | 10/1992 | Hallett ........................ 374/156 |
| 5,169,236 A * | 12/1992 | Iest ............................ 374/156 |
| 5,575,563 A * | 11/1996 | Chiu et al. ................... 374/141 |
| 5,769,542 A * | 6/1998 | Buntin et al. ................ 374/179 |
| 5,889,736 A | 3/1999 | Fujita et al. |
| 6,669,362 B1 * | 12/2003 | Lin et al. ..................... 374/121 |
| 6,791,905 B1 | 9/2004 | Sekiguchi |
| 7,312,773 B1 | 12/2007 | Herzen et al. |
| 2001/0050883 A1 | 12/2001 | Farine et al. |
| 2003/0189876 A1 | 10/2003 | Chan |
| 2004/0016058 A1 | 1/2004 | Gardiner et al. |
| 2004/0114396 A1 | 6/2004 | Kobayashi et al. |

OTHER PUBLICATIONS

The Merriam Webster Dictionary, 2005 edition, p. 521.*

\* cited by examiner

*Primary Examiner*—Edward Tso
*Assistant Examiner*—M'Baye Diao
(74) *Attorney, Agent, or Firm*—James E. Walton; Richard G. Eldredge

(57) ABSTRACT

A solar-powered thermometer includes a temperature display face illuminated by an electrical lighting system. The lighting system is configured for front lighting the display face. A solar energy system conductively couples to the electrical lighting system for providing electrical power to the electrical lighting system.

15 Claims, 5 Drawing Sheets

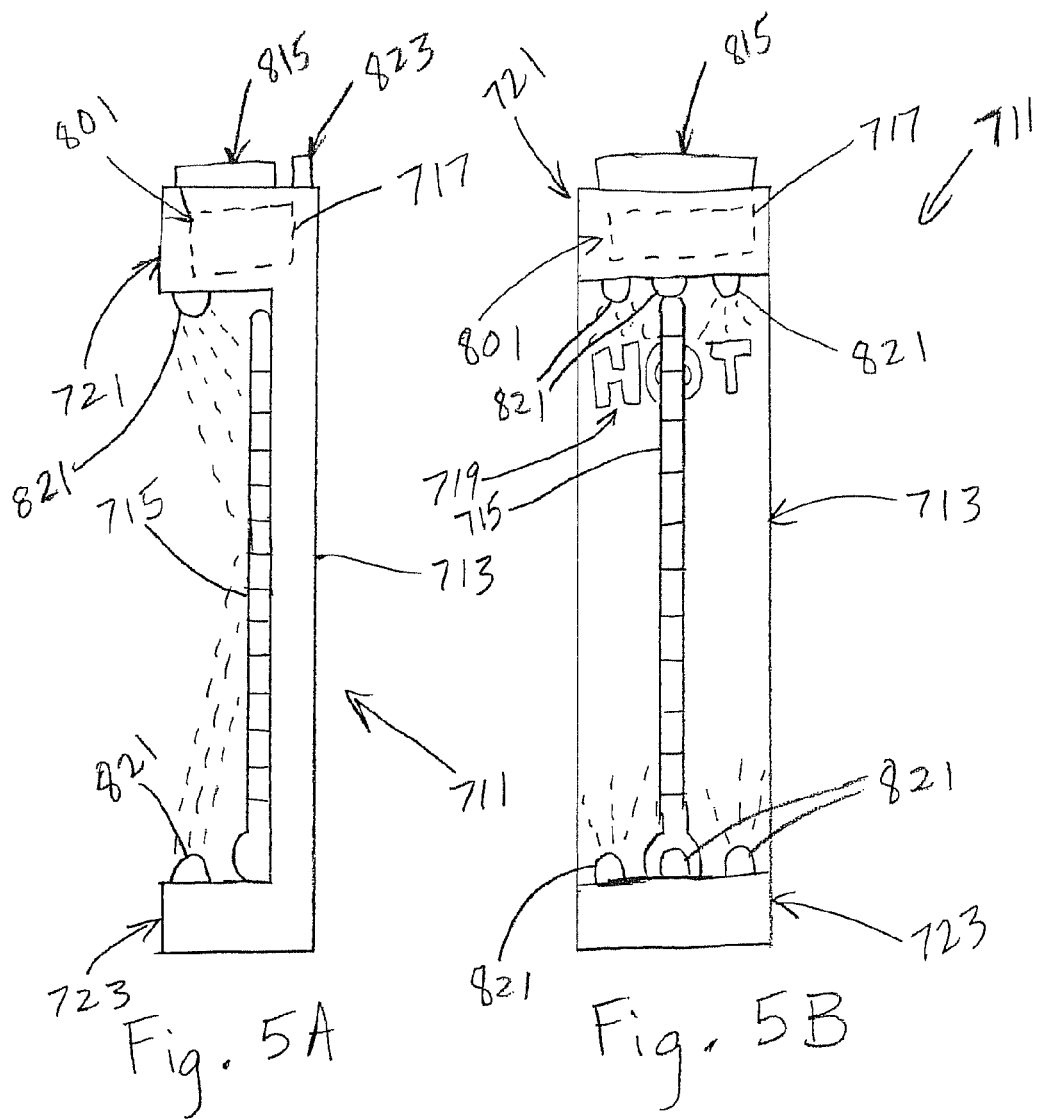

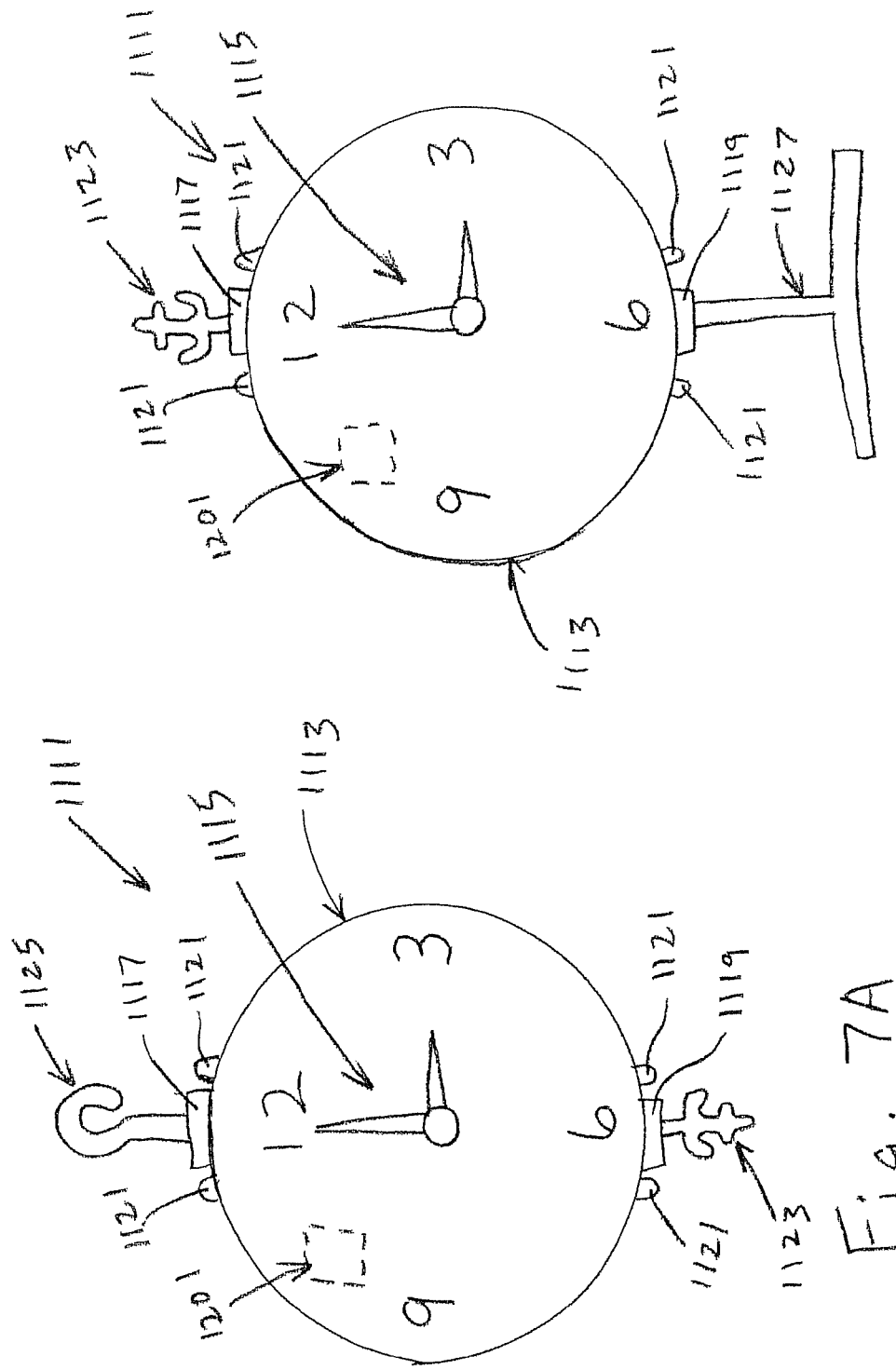

SOLAR-POWERED THERMOMETER

CROSS REFERENCE TO RELATED APPLICATIONS

This application is a Divisional of U.S. application Ser. No. 11/368,193, filed on 3 Mar. 2006, titled "Solar-Powered Thermometer and Clock," which claims the benefit of U.S. Provisional Application No. 60/658,845, filed 4 Mar. 2005, titled "Solar Thermometer and Clock," and which claims the benefit of U.S. Provisional Application No. 60/691,419, filed 17 Jun. 2005, titled "Solar Thermometer and Clock," all of which are hereby incorporated by reference for all purposes as if fully set forth herein.

BACKGROUND OF THE INVENTION

1. Field of the Invention

The present invention relates in general to the field of thermometers and clocks.

2. Description of Related Art

There are many designs of thermometers and clocks well known in the art. However, there remains room for improvement upon current thermometer and clock designs.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which:

FIGS. 5A and 5B are orthographic views of an alternate embodiment of a thermometer system according to the present invention;

FIGS. 7A and 7B are front views of an alternate embodiment of a clock system according to the present invention.

DETAILED DESCRIPTION OF THE PREFERRED EMBODIMENT

Figure 1:
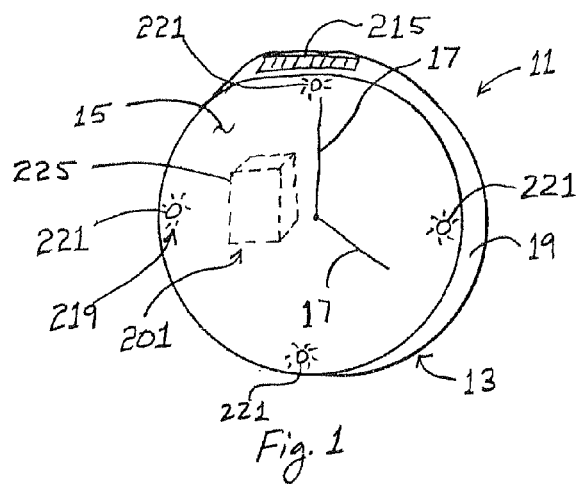
FIG. 1 is a perspective view of the preferred embodiment of a clock system according to the present invention.

Referring now to FIG. 1 in the drawings, the preferred embodiment of a clock system 11 according to the present invention is illustrated. Clock system 11 preferably comprises a body 13, display face 15, clock hands 17, a thick rim 19, a solar energy system 201 (discussed infra), lighting elements 221 (discussed infra), and solar collectors 215. Body 13 is preferably a thick disc shaped structure with adequate interior space to house solar energy system 201 and the required components to enable clock hands 17 to display time. Further, rim 19 is preferably sized such that solar collectors 215 are substantially carried on rim 19 near the top of clock system 11.

Figure 2:
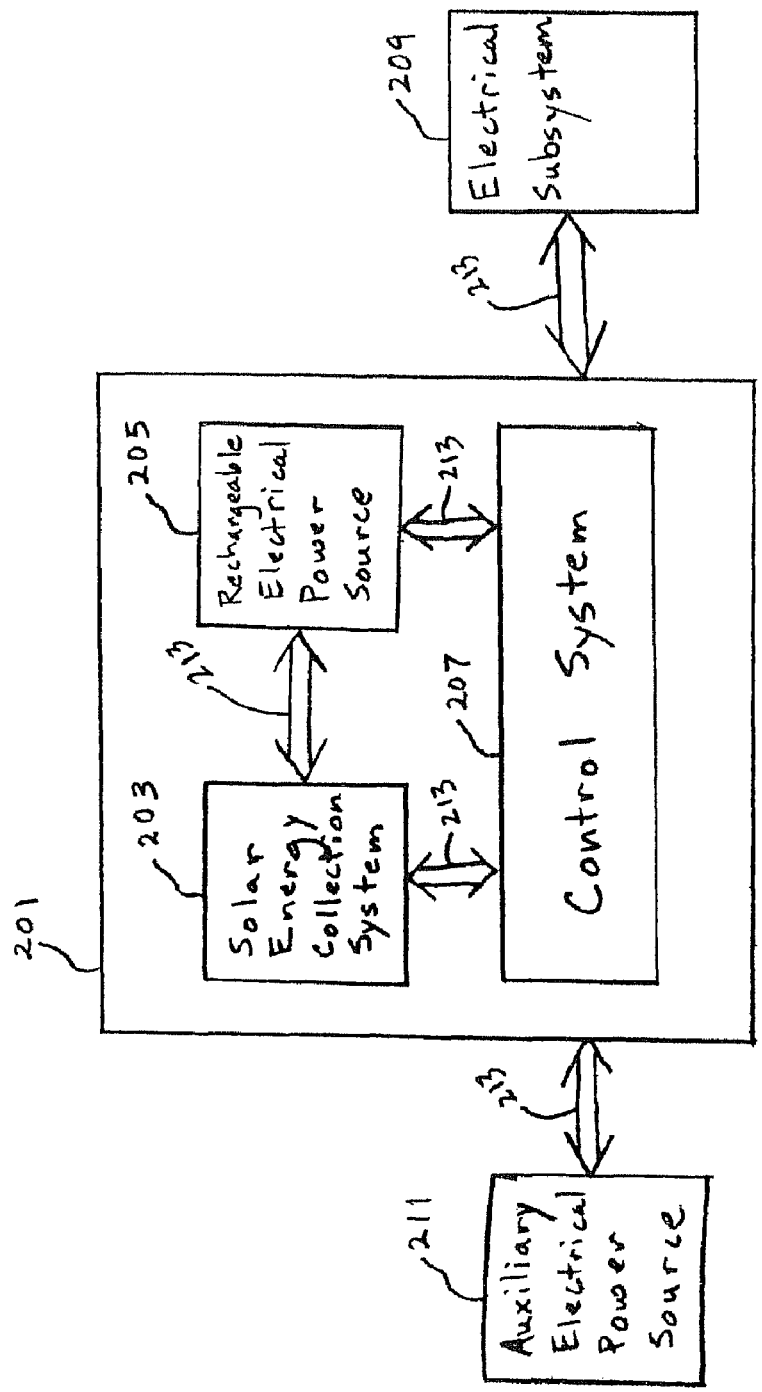
FIG. 2 is a high level schematic view of the solar energy system of the clock system of FIG. 1.

Now referring to FIG. 2, the preferred embodiment of solar energy system 201 according to the present invention is illustrated. Solar energy system 201 preferably comprises a solar energy collection system 203, a rechargeable electrical power source 205, and a control system 207. Solar energy system 201 is preferably conductively coupled to an electrical subsystem 209. Solar energy system 201 may optionally be conductively coupled to an auxiliary electrical power source 211. Conductive coupling is preferably achieved through the use of electrical conductors 213 such as insulated copper wires, circuit boards, or other suitable devices or means for conductively coupling electrical components.

Solar energy collection system 203 preferably comprises a solar collector 215 (see FIG. 1) and other necessary circuitry for receiving and collecting solar energy and converting the solar energy into electrical energy. Solar energy collection system 203 is preferably conductively coupled to both rechargeable electrical power source 205 and control system 207 with electrical conductors 213. Rechargeable electrical power source 205 preferably comprises a rechargeable battery for storing electrical energy; however, rechargeable electrical power source 205 may alternatively comprise any rechargeable electrical power storage device, such as a capacitor, battery pack, any other suitable device for storing electrical energy, or combination thereof. Rechargeable electrical power source 205 is preferably conductively coupled to solar energy collection system 203 and control system 207 with electrical conductors 213.

The purpose of solar energy system 201 is preferably to convert solar energy into electrical energy and to supply that electrical energy to one or more electrical subsystems 209. In operation, solar energy collection system 203 preferably converts solar energy into electrical energy. Solar energy collection system 203 preferably delivers electrical energy to rechargeable electrical power source 205 to provide a trickle charge to rechargeable electrical power source 205. However, when rechargeable electrical power source 205 is fully charged, solar energy collection system 203 preferably delivers electrical energy to control system 207 where the electrical energy is preferably diverted for uses other than charging rechargeable electrical power source 205. For example, the electrical energy could be used to directly power electrical subsystem 209 rather than electrical subsystem 209 consuming power from rechargeable electrical power source 205.

Auxiliary electrical power source 211 preferably comprises an alternating current power source such as power from a conventional AC outlet; however, auxiliary electrical power source 211 may alternatively comprise a direct current power source such as a non-rechargeable battery, one or more fuel cells, a renewable energy source such as a wind powered generator, a rechargeable battery pack (in which the battery pack is removed, recharged remotely, and thereafter replaced back into auxiliary electrical power source 211), or any other electrical power source suitable for providing solar energy system 201 with additional electrical energy. Of course, the foregoing configuration allows for the interchanging, or swapping, of battery packs. Auxiliary electrical power source 211 is preferably conductively coupled to solar energy system 201 and preferably delivers electrical energy to control system 207. Auxiliary electrical power source 211 preferably supplies electrical energy for a variety of uses including: powering electrical subsystem 209, recharging rechargeable electrical power source 205, and powering other solar energy system 201 circuitry such as control system 207.

Alternative embodiments of solar energy system 201 may not include the solar energy collection system 203. Instead, solar energy system 201 may comprise a circuit for powering electrical subsystem 209 operable only by electrical energy supplied by auxiliary electrical power source 211.

Control system 207 preferably comprises circuitry, microprocessors, memory devices, sensors, switches, and other electronic components necessary to: partially or fully direct electrical energy from solar energy collection system 203 to rechargeable electrical power source 205, fully or partially direct electrical energy from solar energy collection system 203 to electrical subsystem 209, allow a user to manually switch solar energy system 201 on and off, receive input to alter or control the performance of the recharging of rechargeable electrical power source 205 and/or the supply of electrical energy to electrical subsystems 209, control the performance of electrical subsystems 209, fully or partially charge rechargeable electrical power source 205 with electrical energy supplied by auxiliary electrical power source 211, and fully or partially power electrical subsystem 209 with electrical energy from auxiliary power source 211.

It should be appreciated that while solar energy system 201 comprises control system 207 in this preferred embodiment, simpler and less sophisticated embodiments of solar energy system 201 are possible. For example, solar energy system 201 may not comprise control system 207, but merely comprise solar energy collection system 203 and rechargeable electrical power source 205 conductively coupled to each other with electrical conductors 213.

As illustrated in FIG. 1, electrical subsystem 209 is preferably a lighting subsystem 219 for providing illumination. Lighting subsystem 219 preferably comprises lighting elements 221 conductively coupled to solar energy system 201. Lighting elements 221 are preferably light emitting diodes (LEDs), but may be organic light emitting diodes, incandescent bulbs, cold cathode ray tubes, fluorescent lights, or any other suitable electrical lighting apparatus, or combination thereof. It should be appreciated that the electrical subsystem 209 of alternate embodiments of the present invention may be a water pumping subsystem, sound subsystem, video subsystem, microphone subsystem, receiving and transmitting subsystem, motion actuating subsystem, cooling subsystem, heating subsystem, raising and lowering subsystem, water agitation subsystem, electrical motor subsystem, any other electrically powered subsystem, or combination thereof.

A translucent shield, a lens, reflector, light fixture, or a combination of these may optionally be attached to or operably associated with lighting subsystem 219 to enhance or alter the illumination provided by lighting elements 221. The optional shields, lenses, reflectors, and fixtures may also be configured to prevent water, dirt, or other particulate matter from interfering with the operation of lighting elements 221. Further, it should be appreciated that the optional shields, lenses, reflectors, and fixtures may be incorporated into any embodiment of the present invention.

It should be appreciated that lighting subsystem 219 and control system 207 may include selected components, circuitry, and microprocessor control chips to produce a variety of optional features. For example, optional features may include: manual lighting intensity controls, blinking lights, fading lights, changing the light color, motion activated lighting, sound activated lighting, a wide variety of lighting sequence or motion effects, and any other appropriate lighting effects or interactive means for controlling lighting effects. Of course, any components, circuitry, microprocessor control chips, or other means of controlling or altering the functionality of electrical subsystem 209 would be conductively coupled to solar energy system 201, electrical subsystem 209, and/or auxiliary electrical power source 211. Further, where electrical subsystem 209 is not a lighting subsystem 219, it should be appreciated that similar controls, programming capabilities, interactive input devices, and other electrical subsystem 209 performance controls or alteration means may be incorporated into the electrical subsystem 209 and/or the associated control system 207.

A photo resistor, or photo cell 223 (see FIG. 1), is preferably incorporated into the preferred embodiment of control system 207. Photo cell 223 detects the presence of light and controls whether lighting elements 221 provide illumination, by switching lighting elements 221 on or off, or by regulating the intensity of light provided by lighting elements 221. For example, when photo cell 223 detects a substantial amount of light, lighting elements 221 are switched off and provide no illumination. However, when photo cell 223 detects a low level of light, lighting elements 221 are switched on and provide illumination. Alternatively, photo cell 223 may be used to dim or brighten the output of lighting elements 221. In addition, one or more on-off switches or buttons may be incorporated into control system 207 to facilitate the operation of solar energy system 201, or to vary the operation and control of solar energy system 201, auxiliary electrical power source 211, or electrical subsystem 209. It will be appreciated that the operation of solar energy system 201, auxiliary electrical power source 211, and electrical subsystem 209 may be controlled remotely by infrared light, radio wave, or other types of transmitters and receivers.

It should be appreciated that solar energy system 201 may further comprise or be conductively coupled to a connection port for conveniently interfacing solar energy system 201 with other components, systems, subsystems, or any other suitable devices. The connection port is preferably conductively coupled with control system 207; however, connection port may alternatively be conductively coupled to any other component of solar energy system 201, auxiliary electrical power source 211, or electrical subsystem 209. More specifically, connection ports may be adapted to interface with electrical devices electrical devices having power plugs compatible with the connection port. Connection ports would be a great convenience because electrical devices such as lights, fans, radios, or other suitable electrical devices could be supplied power or controlled by solar energy system when connected to the connection port.

Components of solar energy system 201, auxiliary electrical power source 211, and electrical subsystem 209 may be located substantially near each other. For example, in the preferred embodiment, with the exceptions of solar collectors 215, photo cell 223, and lighting elements 221, much of the circuitry of solar energy system 201, auxiliary electrical power source 211, and electrical subsystem 209 is preferably substantially housed within an enclosure 225 (see FIG. 1). It should be appreciated that the components of solar energy system 201, auxiliary electrical power source 211, and electrical subsystem 209 are preferably substantially protected such that water, dirt, and other matter is prevented from interfering with the operation of solar energy system 201, auxiliary electrical power source 211, and electrical subsystem 209. It should also be appreciated that in alternative embodiments, components of solar energy system 201, auxiliary electrical power source 211, and electrical subsystem 209 may not be housed in enclosure 225 and may be located substantial distances from each other while remaining conductively coupled. For example, an alternative embodiment of the present invention may be configured such that solar collector 215 is located on a home rooftop and is conductively coupled to rechargeable electrical power source 205, other components, systems, and/or subsystems which are located a significant distance away from solar collector 215, such as near the ground level of the home.

It should be appreciated that enclosure 225 may alternatively be adapted to carry all or substantially all of the components of solar energy system 201, electrical subsystem 209, and auxiliary electrical power source 211. In alternative embodiments of the present invention, enclosure 225 may be shaped and adapted for easy connection to and disconnection from the structure supporting enclosure 225. For example, an embodiment of enclosure 225 may allow enclosure 225 to be removably attached to the structure supporting enclosure 225, subsequently detached from the structure, and later removably attached to a different supporting structure. Alternatively, enclosure 225 may be integrally or sealably attach to a supporting structure. For example, enclosure 225 may be attached such that it passes through a hole in a supporting structure and forms a watertight seal with that hole. It should be appreciated that in alternative embodiments where the enclosure carries the entire solar energy system and/or other circuitry or systems, the enclosure may be inset, inlaid, or disposed in a recessed space of the supporting structure. For example, the body may have a space cut out for fully or partially receiving the enclosure whereby lighting elements may illuminate clock system from a recessed area of the body. Further, enclosure 225 may alternatively be attached to different types of structures or embodiments of the present invention suitable for supporting or carrying enclosure 225.

Components of solar energy system 201, auxiliary electrical power source 211, and electrical subsystem 209 may located and/or operably associated with various locations on each embodiment of clock system, including within body 13 or attached to the exterior of body 13. Additionally, components of solar energy system 201, auxiliary electrical power source 211, and electrical subsystem 209 systems may be located remote from and even significantly distant from each clock system. Enclosure 225 is preferably located in a hollow portion of body 13; however, it should be appreciated that in some embodiments of the present invention, one or more components of solar energy system 201 may be located remote from the interior of body 13.

Solar collector 215 may be located at any suitable location on or about clock system 11 or remote from clock system 11; however, it is preferred that solar collector 215 be optimally exposed to solar light. Solar collector 215 is preferably attached body 13 along rim 19, but may alternately be located remote from rim 19. For those applications in which clock system 11 is primarily a decorative piece displayed indoors, it may be desirable to locate solar collector 215 at a location on clock system 11 that is near or faces a window, or at a location remote from clock system 11 where the remote location may have different ambient lighting conditions. For example, if clock system 11 is located indoors with low levels of light available for conversion to electrical energy by solar collector 215, solar collector 215 may be located outdoors to expose solar collector 215 to more light. It should be understood that sufficiently long electrical conductors 213 are incorporated to achieve remote placement of solar collectors 215 and other remotely located electrical components. For similar reasons, photo cell 223 is also preferably attached rim 19, but may alternately be located remote from rim 19.

Lighting elements 221 are preferably attached to face 15. Lighting elements 221 may also optionally be operably associated with rim 19, clock hands 17, or other locations on body 13. Lighting elements 221 preferably illuminate clock system 11 and/or the space in and around clock system 11. Specifically, lighting elements 221 are preferably connected face 15 and arranged to illuminate face 15 and clock hands 17 in a manner such that face 15 and clock hands 17 are substantially illuminated. It should be appreciated that lighting elements 221 may alternatively be located remote from body 13 such that lighting elements 221 provide illumination to spaces significantly remote from body 13. For example, multiple lighting elements 221 may be located remote from body 13 so that the remotely located lighting elements 221 illuminate a path or walkway leading to body 13.

It should be appreciated that body 13 and other elements of clock system 11 may alternatively be constructed of optically conductive material such as glass or a translucent plastic. Where an element of clock system 11 is constructed of an optically conductive material, lighting elements 221 may be located within body 13 or attached to the optically conductive member, thereby optionally creating a glowing illumination effect.

In alternative embodiments, multiple lighting elements may be located on or about clock system 11. The multiple lighting elements may be arranged in a manner such that the lighting elements illuminate with strips of illumination. Further, alternate embodiments of clock system 11 may include more than one solar energy system to independently power multiple lighting elements.

Figure 3:
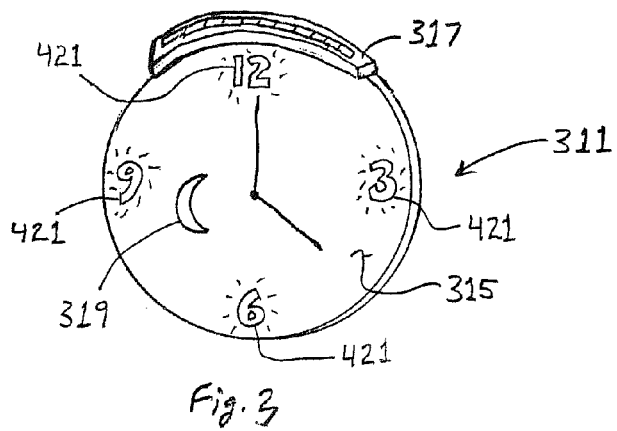
FIG. 3 is a perspective view of an alternate embodiment of a clock system according to the present invention.

Referring now to FIG. 3 in the drawings, an alternative embodiment of the present invention is illustrated as a clock system 311. Clock system 311 is similar to clock system 11 and comprises a body 313 which is sized and shaped similar to body 13 and a solar energy system 401 (not shown) similar to solar energy system 201; however, body 313 is significantly thinner from face 315 to the back side of clock system 11. Hence, solar collector 415 is preferably carried by a panel 317 protruding from the top edge of face 315. Clock system 311 also differs from clock system 11 in that solar energy system 401 is preferably carried on the back side of body 313 instead of inside body 313. It is also worth noting that lighting elements 421 are shown has being housed within numeral shaped lenses or fixtures such that when illuminated, the numeral shaped fixtures appear to glow. Finally, face 315 is shown as carrying a moon shaped indicia 319 which may be selectively illuminated by lighting elements 421 in a preprogrammed manner related to moon phases, time of day, or other selected criteria.

Figure 4:
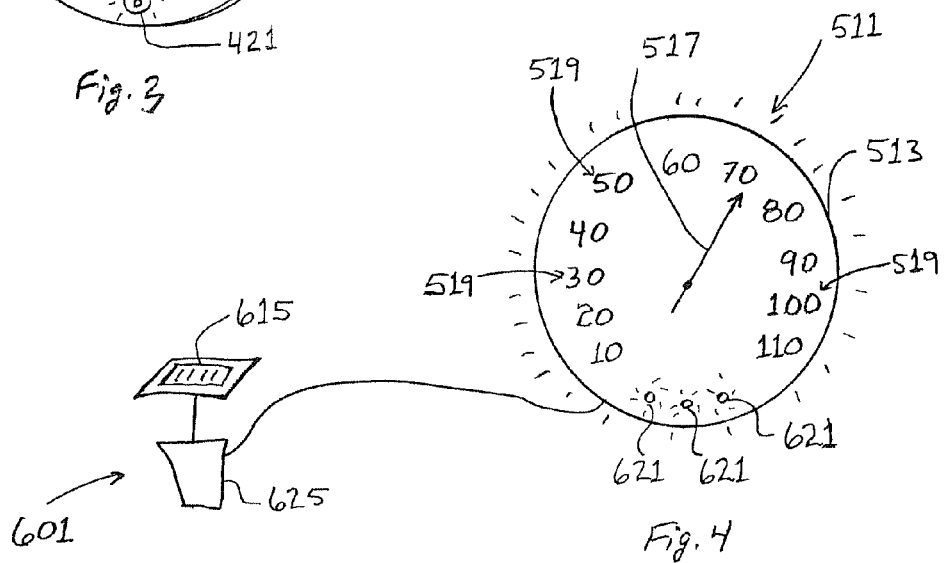
FIG. 4 is a perspective view of the preferred embodiment of a thermometer system according to the present invention.

Referring now to FIG. 4 in the drawings, the preferred embodiment of a thermometer system according to the present invention is illustrated. Thermometer system 511 comprises a body 513 similar to body 313 and a solar energy system 601 similar to solar energy system 201; however, body 513 does not carry solar collector 615 or the majority of the other components of solar energy system 601. Body 513 carries the necessary components to move hand 517 to a position representative of a particular temperature such that when combined with the properly aligned indicia 519 on face 515, a user can read the temperature. Solar energy system 601 is illustrated as being located remote from display body 515. Solar energy system is preferably housed within enclosure 625. Solar energy system 601 is operationally significantly similar to solar energy system 201 but the placement of the various elements of solar energy system 601 vary from the placement of the elements of solar energy system 201. For example, while no other components of solar energy system 601 are carried by body 513, lighting elements 621 are located on face 515 such that face 515, the indicia carried by face 515, and hand 517 are all substantially illuminated. It should be appreciated that solar energy system 601 may optionally provide for selective changing of the colors displayed by lighting elements 621. For example, blue illumination may be emitted when the temperatures are cold, yellow illumination emitted when the temperature is warm, and red illumination emitted when the temperature is hot.

Referring now to FIGS. 5A and 5B in the drawings, an alternate embodiment of a thermometer system according to the present invention is illustrated. Thermometer system 711 comprises a mount 713, a mercury thermometer 715, and a solar energy system 801 similar to solar energy system 201. Mount 713 is illustrated as being substantially rectangular and adapted for carrying mercury thermometer 715. Of course thermometer 715 may optionally be removably attached to mount 713. Mount 713 is illustrated as having an internal void for housing a substantial portion of solar energy system 801; however, it should be appreciated that solar energy system 801 may alternatively be carried within a separate enclosure and mounted to or located near mount 713. Further, mercury thermometer 715 is preferably marked with calibrated graduation marks so as to allow a user of the thermometer to read the temperature therefrom. Any of the surfaces of mount 713 may be decoratively or functionally enhanced with graphical indicia or paint such as graphical indicia 719. Mount 713 is illustrated as having an upper ledge 721 and a lower foot 723. As illustrated, solar collectors 815 and photo cell 823 are located on a top face of mount 713; however, solar collectors 815 and photo cell 823 may alternatively be located at any other suitable location on, about, or remote from mount 713. Lighting elements 821 are illustrated as being located both on a lower portion of ledge 721 and an upper portion of foot 723. Lighting elements 821 are illustrated as being oriented so as to substantially illuminate thermometer 715 and indicia 719. Of course, mercury thermometer 715 could be combined with solar energy system 801 in a myriad of other ways.

Figure 6B:
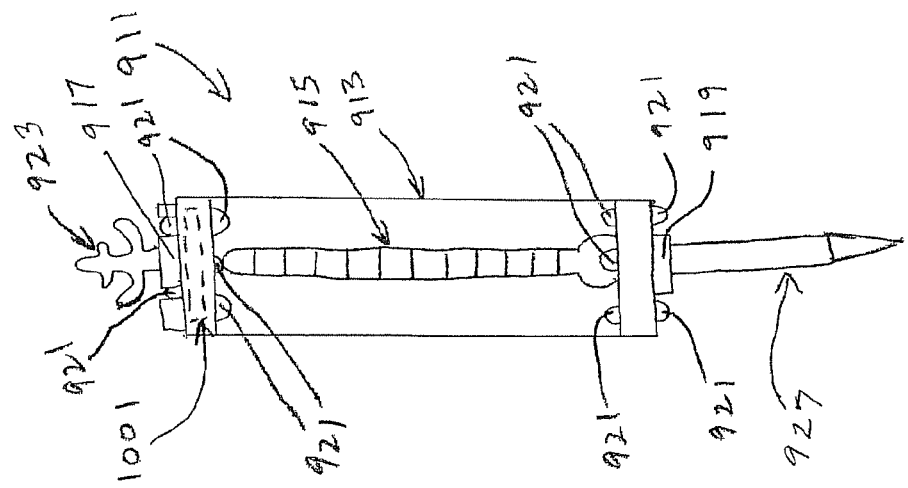
FIGS. 6A and 6B are front views of an alternate embodiment of a thermometer system according to the present invention.
Figure 6A:
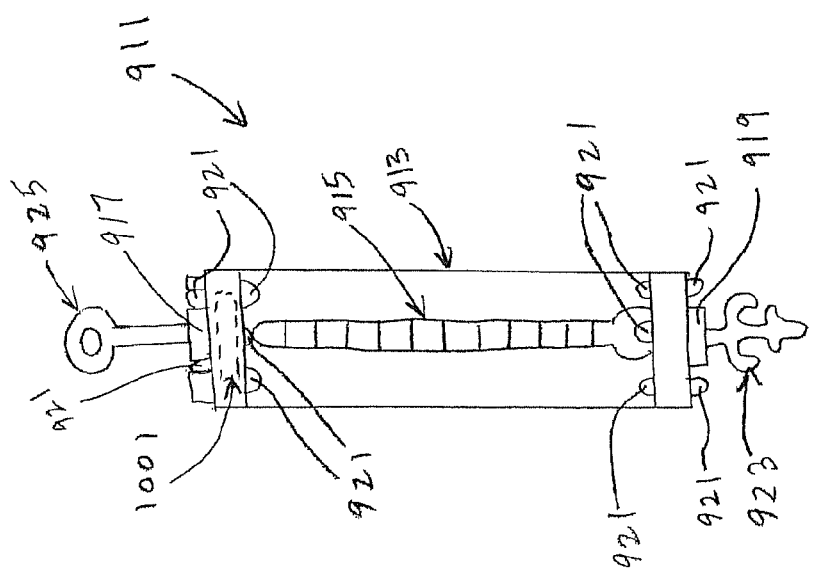

Referring now to FIGS. 6A and 6B in the drawings, an alternate embodiment of a thermometer system according to the present invention is illustrated. Thermometer system 911 comprises a mount 913, a mercury thermometer 915, and a solar energy system 1001 similar to solar energy system 201. Thermometer system 911 is substantially similar to thermometer system 711; however, mount 913 includes an upper attachment means 917, lower attachment means 919, and additional lighting elements 921. Upper attachment means 917 and lower attachment means 919 are adapted to selectively receive and retain decorative elements 923 and/or support structures. As shown in FIG. 6A, thermometer system 911 may be configured for suspension by selectively attaching a hanging means 925 (shown as an eye-bolt type structure) to upper attachment means 917. When thermometer system 911 is configured for suspension, it is desirable to attach a decorative element 923 (shown as a finial type structure) to lower attachment means 919. Further, thermometer system 911 includes lighting elements 921 located and oriented to optionally illuminate the decorative element 923 and/or the support structure 925.

As illustrated in FIG. 6B, thermometer system 911 may be configured as a freestanding unit. To configure thermometer system 911 as a freestanding unit, it is desirable to selectively attach a support means 927 (shown as a stake type structure) for vertically supporting thermometer system 911. Of course support means 927 may alternatively be a pedestal type structure or any other suitable means for vertically supporting thermometer system 911. When thermometer system 911 is configured as a freestanding unit, it is desirable to attach a decorative element 923 (shown as a finial type structure) to upper attachment means 917. Of course, where thermometer system 911 is mounted to a wall or otherwise supported by means other than upper and/or lower attachment means 917, 919, decorative elements 923 may be attached to both upper and lower attachment means 917, 919.

Referring now to FIGS. 7A and 7B in the drawings, an alternate embodiment of a clock system according to the present invention is illustrated. Clock system 1111 comprises a body 1113, time display means 1115, and a solar energy system 1201 similar to solar energy system 201. Clock system 1111 is substantially similar to clock system 11; however, body 1113 includes an upper attachment means 1117, lower attachment means 1119, and additional lighting elements 1121. Upper attachment means 1117 and lower attachment means 1119 are adapted to selectively receive and retain decorative elements 1123 and/or support structures. As shown in FIG. 7A, clock system 1111 may be configured for suspension by selectively attaching a hanging means 1125 (shown as a hook type structure) to upper attachment means 1117. When clock system 1111 is configured for suspension, it is desirable to attach a decorative element 1123 (shown as a finial type structure) to lower attachment means 1119. Further, clock system 1111 includes lighting elements 1121 located and oriented to optionally illuminate the decorative element 1123 and/or the support structure 1125.

As illustrated in FIG. 7B, clock system 1111 may be configured as a freestanding unit. To configure clock system 1111 as a freestanding unit, it is desirable to selectively attach a support means 1127 (shown as a pedestal stand type structure) for vertically supporting clock system 1111. Of course support means 1127 may alternatively be a stake type structure or any other suitable means for vertically supporting clock system 1111. When clock system 1111 is configured as a freestanding unit, it is desirable to attach a decorative element 1123 (shown as a finial type structure) to upper attachment means 1117. Of course, where clock system 1111 is mounted to a wall or otherwise supported by means other than upper and/or lower attachment means 1117, 1119, decorative elements 1123 may be attached to both upper and lower attachment means 1117, 1119.

While this invention has been described with reference to an illustrative embodiment, this description is not intended to be construed in a limiting sense. Various modifications and other embodiments of the invention will be apparent to persons skilled in the art upon reference to the description.

I claim:

1. A thermometer, comprising:
    a body having an external surface;
    a temperature display means carried by the body, the temperature display means having a display face;
    an electrical lighting system for front lighting the temperature display means, the electrical lighting system being positioned on the external surface of the body and oriented such that a lighting element from the electrical lighting system externally illuminates light directly onto the display face from the front of the display face; and
    a solar energy system conductively coupled to the electrical lighting system, the solar energy system comprising:
        a rechargeable electrical power source; and
        a solar energy collection system conductively coupled to the rechargeable electrical power source for recharging the rechargeable electrical power source.

2. The thermometer according to claim 1, further comprising:
    an attachment means connected to the body for suspending the thermometer from a support structure.

3. The thermometer according to claim 2, wherein the support structure is selected from a group consisting of a wall, a table top, and a stake.

4. The thermometer according to claim 1, further comprising:
   at least one decorative element releasably attached to the body.

5. The thermometer according to claim 1, wherein the rechargeable electrical power source is adapted to be recharged by a source of alternating current.

6. The thermometer according to claim 1, further comprising:
   an electrical subsystem operably associated with the temperature display means.

7. The thermometer according to claim 6, wherein the electrical subsystem is selected from the group consisting of sound subsystems, video subsystems, cooling subsystems, heating subsystems, water pumping subsystems, microphone subsystems, receiving and transmitting subsystems, motion actuating subsystems, water agitation subsystems, electrical motor subsystems, and combinations thereof.

8. The thermometer according to claim 1, further comprising:
   a translucent shield for protecting the lighting element.

9. The thermometer according to claim 8, wherein the translucent shield is adapted to reflect light emitted from the lighting element.

10. The thermometer according to claim 1, wherein the rechargeable electrical power source includes at least one rechargeable battery.

11. A thermometer, comprising:
   a body;
   a temperature display means carried by the body, the temperature display means having a display face;
   an electrical lighting system for front lighting the temperature display means, the electrical lighting system being positioned such that a lighting element from the electrical lighting system illuminates light directly onto the display face from the front of the display face; and
   a solar energy system conductively coupled to the electrical lighting system, the solar energy system comprising:
      a rechargeable electrical power source; and
      a solar energy collection system conductively coupled to the rechargeable electrical power source for recharging the rechargeable electrical power source,
   wherein the rechargeable electrical power source includes at least one rechargeable battery pack adapted for remote recharging.

12. The thermometer according to claim 1, wherein the lighting system is activated by a photo cell.

13. The thermometer according to claim 1, wherein the solar energy system is carried by the body.

14. A thermometer, comprising:
   a body;
   a temperature display means carried by the body, the temperature display means having a display face;
   an electrical lighting system for front lighting the temperature display means, the electrical lighting system being positioned such that a lighting element from the electrical lighting system illuminates light directly onto the display face from the front of the display face; and
   a solar energy system conductively coupled to the electrical lighting system, the solar energy system comprising:
      a rechargeable electrical power source; and
   a solar energy collection system conductively coupled to the rechargeable electrical power source for recharging the rechargeable electrical power source;
      wherein at least a portion of the solar energy system is located remote from the body.

15. The thermometer according to claim 1, wherein the lighting element is chosen from the group of light emitting diodes, organic light emitting diodes, cold cathode ray tubes, fluorescent lights, incandescent bulbs, and neon bulbs.

\* \* \* \* \*